US012566097B2

(12) United States Patent
Bousseksou et al.

(10) Patent No.: US 12,566,097 B2
(45) Date of Patent: Mar. 3, 2026

(54) USE OF A SPIN TRANSITION MATERIAL TO MEASURE AND/OR LIMIT THE TEMPERATURE OF ELECTRONIC/PHOTONIC COMPONENTS

(71) Applicant: CENTRE NATIONAL DE LA RECHERCHE SCIENTIFIQUE, Paris (FR)

(72) Inventors: Azzedine Bousseksou, Toulouse (FR); Lionel Salmon, Toulouse (FR); Gabor Molnar, Toulouse (FR); Christian Bergaud, Toulouse (FR); Karl Ridier, Toulouse (FR); Carlos Quintero, Toulouse (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 784 days.

(21) Appl. No.: 17/765,532

(22) PCT Filed: Oct. 1, 2020

(86) PCT No.: PCT/EP2020/077495

§ 371 (c)(1),
(2) Date: Mar. 31, 2022

(87) PCT Pub. No.: WO2021/064094

PCT Pub. Date: Apr. 8, 2021

(65) Prior Publication Data

US 2022/0341792 A1    Oct. 27, 2022

(30) Foreign Application Priority Data

Oct. 1, 2019    (FR) ...................................... 19 10886

(51) Int. Cl.
*G01K 11/125* (2021.01)
*G01K 11/14* (2006.01)

(52) U.S. Cl.
CPC ............ *G01K 11/125* (2013.01); *G01K 11/14* (2013.01)

(58) Field of Classification Search
CPC .............................. G01K 11/125; G01K 11/14
(Continued)

(56) References Cited

U.S. PATENT DOCUMENTS 8,963,106 B2 *    2/2015    Letard .................. H10D 48/385
250/492.1
2010/0256708 A1    10/2010    Thornton
(Continued)

FOREIGN PATENT DOCUMENTS

JP        2013535360 A        9/2013
WO        2014033827 A1        8/2016

OTHER PUBLICATIONS

Kraieva et al: "High Spatial Resolution Imaging of Transient Thermal Events Using Material with Thermal Memory", Small, vol. 12, No. 46, p. 6325-6331, Dec. 1, 2016.
(Continued)

*Primary Examiner* — Ori Nadav
(74) *Attorney, Agent, or Firm* — WCF IP

(57) ABSTRACT

The invention relates to the use of a spin transition material to measure and/or limit the temperature in an electronic and/or photonic component, to methods for thermometrically measuring and/or limiting the overheating of components, as well as to electronic or photonic components comprising a film composed of said spin transition material.

5 Claims, 6 Drawing Sheets

(a)

(b)

(c)

(58) Field of Classification Search
USPC ........................................................ 257/712
See application file for complete search history.

(56) References Cited

U.S. PATENT DOCUMENTS

| | | | |
|---|---|---|---|
| 2012/0010030 A1* | 1/2012 | Bousseksou | A63C 19/065 |
| | | | 473/490 |
| 2016/0104544 A1 | 4/2016 | Schafer et al. | |
| 2017/0010161 A1 | 1/2017 | Freysz et al. | |

OTHER PUBLICATIONS

Shalabaeva, V. et al., "Vacuum deposition of high-quality thin films displaying spin transition near room temperature", J. Mater. Chem. C 2017 5 4419.
Rat, S. et al., Solvatomorphism and structural-spin crossover property relationship in bis[hydrotris(1,2,4-triazol-1-yl) borate]iron(ii), CrystEngComm 2017 19 3271.

* cited by examiner

USE OF A SPIN TRANSITION MATERIAL TO MEASURE AND/OR LIMIT THE TEMPERATURE OF ELECTRONIC/PHOTONIC COMPONENTS

The present invention relates to the measurement and the limitation of the temperature (to avoid overheating phenomena) in electronic components.

In the field of microelectronics, with the development of new technologies and the increase in telecommunication throughputs, there is clearly a growing need (1) to quickly detect "hotspots" (industrial diagnostics), which may deteriorate the performance of these devices, and (2) to develop simple solutions to limit the consequences thereof. In fact, at this time, the overheating of electronic components constitutes a major problem affecting many electronic boards installed in various apparatuses such as servers, computers, tablets, mobile telephones and connected objects, to cite just a few. The consequences of this overheating may range from a simple slowdown of software to failure, and even irreversible deterioration of the apparatuses in the worst case scenario. There is therefore a strong need in the microelectronics field to analyze and limit the overheating of components.

Temperature measurements on electronic devices are generally done by infrared thermography, thermoreflectance, Raman microscopy, thermal scanning microscopy or fluorescence thermometry.

The limitation of the temperature of the components (also called thermal inertia) is typically done by using cooling systems in order to offset overheating problems. Air, water or solid-liquid phase change material (PCM) cooling systems are in particular found. Air cooling systems are most commonly used. There are two types: passive and active. The passive system is made up of a simple radiator that facilitates the free circulation of air near the heating elements. In most cases, this system is not sufficient, and it is associated with a fan (active system) that discharges the hot air outside the case of a computer, for example. A water or refrigerant circuit allows the temperature increase within the case to be limited. These water or phase change systems appear to be too expensive, dangerous and often unsuitable due to tightness problems to be used very widely in electronic apparatuses intended for the general public. Furthermore, aside from being too bulky to be integrated into certain ultra flat laptop computers or tablets, these systems are somewhat inefficient.

There is no simple, stable and inexpensive solution for providing a fast integrated measurement of a temperature increase and/or a limitation thereof. There is therefore a real need to find a system that can be integrated, is compact and is flexible (with no predefined shape) in order to test and avoid overheating of the electronic components present in everyday objects.

The articles J. Mater. Chem., 2010, 20, 5499-5503, J. Mater. Chem., 2012, 22, 3745, Small, 2016, 12, 6325, and the proceedings of the 16TH INTERNATIONAL WORKSHOP ON THERMAL INVESTIGATIONS OF ICS AND SYSTEMS, October 2010 recount the possibility of using a spin transition material (optionally by combining it with a fluorescent probe) for applications in the fields of micro- and nano-thermometry.

Nevertheless, for these applications, it remains to implement a material having exceptional properties of thermal stability and resilience during its shaping and its thermal cycling, whose energy properties combined with the thermal transition properties allow it to be used as a thermal and temperature limiting probe.

It has now been discovered that these uses may be implemented with a spin transition material, having specific properties, in particular of shaping, resilience and thermal stability, allowing the targeted applications.

Thus, according to a first object, the present invention therefore relates to an electronic or photonic component comprising a film deposited over all or part of said component, said film comprising a spin transition material, characterized in that the spin transition material has the following properties:

a. Said material has a spin transition at a temperature of between 40 and 100° C. with a hysteresis width less than 1° C., b. The stability of said spin transition temperature on cycling is greater than 10,000 thermal cycles with a reproducibility less than or equal to 1° C.;

c. Said material is sublimable.

The spin transition phenomenon is accompanied by a change in optical (absorption, optical index), magnetic, mechanical and dielectric properties, allowing, in the case of thermochromatic materials, a significant and reversible color change under the effect of a temperature variation. This involves a reversible transition between the low-spin and high-spin electronic states, which occurs within certain transition metal complexes, and which corresponds to an intramolecular electronic reconfiguration. Furthermore, the passage from the low-spin state to the high-spin state is an endothermic process (the compound stores heat).

It therefore involves using a spin transition compound in particular in the microelectronics field, so as on the one hand (1) to locally test the temperature of operating electronic components, and in particular to test for an unwanted temperature increase through an optical measurement (imaging) (micro-thermometry), and on the other hand (2) to limit/damp this temperature increase by using the inherent endothermic properties of the material (thermal inertia); these two applications may be done simultaneously with the same so-called multifunctional material.

The invention relates to the implementation of said spin transition material to measure (thermometry) and limit (thermal inertia) a temperature increase, in particular in the electronics field.

Typically, the spin transition materials that may be suitable for the invention have a spin transition temperature of between 40° C. and 100° C., in particular between 50 and 70° C.

Advantageously, said spin transition material is [Fe(HB(1,2,4-triazol-1-yl)$_3$)$_2$], bis[hydrotris(1,2,4-triazol-1-yl)borate]iron(II). The synthesis of this material was published in 1994 (Chem. Ber., 1994, 127, 1379) and the spin transition properties were measured in 1996 (Chem. Eur. J., 1996, 2, 992-1000). Nevertheless, the application of this material in the microelectronics field had never been considered.

This material has a spin transition temperature Tmax=62° C., which is ideal for detecting hotspots in microelectronics, with an abrupt transition thus making it compatible with thermometric measurements, unexpectedly associated with thermal stability and indefatigability during repeated thermal cycles. This material is also sublimable, thus allowing it to be deposited on the components.

Typically, the materials according to the invention have an abrupt spin transition. The abrupt nature of the transition defines the temperature range over which each of the transitions is done. According to the invention, "abrupt" is defined as a transition whereof 80% of the spin state change occurs over a temperature range of less than 10° C.

The hysteresis width defines the temperature deviation between the low-spin to high-spin (heating) and high-spin to low-spin (cooling) transitions.

Advantageously, according to the invention, the spin transition is done "without thermal hysteresis," that is to say, such that the hysteresis width is typically less than 1° C.

According to one embodiment, said material may be deposited in the form of a continuous and uniform thin layer with a thickness of between 10 nm and 10 μm, over at least part of the surface of said component.

Said material may be sublimated such that thin films of several tens of nanometers to several micrometers thick may be made on different substrates/circuits. These films are the site of a stable and abrupt spin transition.

An electronic or photonic component suitable for the invention refers to an element intended to be assembled with others so as to perform one or several electronic or photonic functions, and which may undergo a temperature increase during its operation. Examples in particular include passive or active components, and more particularly diodes, transistors, integrated circuits, resistors, capacitors, coils, etc. Examples of photonic components include laser diodes and any other device based on engineering of optical indices at the interfaces, giving the latter high sensitivity to any temperature variation.

According to another object, the present invention also relates to an electronic circuit or a photonic device comprising at least one component according to the invention.

According to another object, the present invention also relates to a method for preparing a component according to the invention comprising the step of depositing said spin transition material in a thin layer, for example by sublimation or spin coating, on all or part of said component. The deposition may thus be done using the method described in the article J. Mater. Chem. C, 2017, 5, 4419, to obtain thin films in which the transition properties of the material are preserved.

Deposition by sublimation is a vapor deposition technique, under vacuum, that allows a thin layer of controlled thickness to be obtained. Deposition by spin coating may be done by application or adaptation of the method described in EP 1,430,552.

The deposition conditions as well as the inherent properties of the material are nondestructive the properties and the performance of the electronic or photonic component and/or circuit.

According to another object, the present invention also relates to the use of a spin transition material as defined above to measure and/or limit a temperature increase in an electronic or photonic component and/or circuit.

Regarding the measurement of the temperature increase, the use according to the invention is based on the measurement of an optical property of the spin transition material. This constitutes a simple, noninvasive and profitable method that may provide thermal imaging with a good temporal and spatial resolution. This allows a thermal map of electronic and/or photonic nanocomponents to be established precisely and reproducibly.

By way of optical property, the optical index, the optical reflectivity or the optical absorbance may in particular be measured.

Advantageously, the optical property may be measured with a spatial resolution allowing several hundreds of nanometers (diffraction limit) to be reached.

Thus, according to one object, the present invention relates to a method for measuring a temperature increase beyond a temperature Tmax within an electronic or photonic component and/or circuit as defined above and such that the spin transition temperature of the material is equal to Tmax, said method comprising:

a. Measuring at least one optical property of said material when said component and/or circuit is off, b. Measuring at least one optical property of said material when said component and/or circuit is on, c. Identifying zones for which said optical property varies following the spin transition of said material.

According to one embodiment, steps b) and c) may be repeated at different base temperatures below Tmax, by increasing and/or decreasing the temperature of said component and/or circuit, and a map of the temperature of said component and/or circuit is established.

Regarding the limitation of the temperature increase, the use according to the invention is based on the heat storage properties by said material to damp a temporary temperature increase generated by an electronic component overheating due to its intensive operation or if it is defective. The use according to the invention combines the advantages of a passive system (silent technology that does not consume energy) and the effectiveness of an active system. The physics principle used is that of endothermic transition. This principle is generally used via solid-liquid phase change materials (PCM). According to the invention, this principle is used with a molecular spin transition material, without state change (fusion), and as a result, is more stable, more viable (avoiding tightness problems) and also not flammable.

Thus, according to another object, the present invention relates to a method for limiting the temperature in an electronic or photonic component and/or circuit as defined above, below a temperature Tmax, such that Tmax is equal to the spin transition temperature of said material, said method comprising:

a. The temperature increase of said component and/or circuit during its operation, b. When said temperature reaches the value Tmax, said material undergoes an endothermic spin transition toward the high-spin phase absorbing all or part of the overheating energy and thus limiting the temperature increase until the complete transformation of said material toward the high-spin phase.

FIGURES

FIG. 1 shows the evolution of optical properties of a thin film of [Fe(HB(1,2,4-triazol-1-yl)$_3$)$_2$]200 nm thick as a function of temperature: (a) Optical absorption (λ equals 317 nm) as a function of the temperature measured after 4.1858 and 10,321 thermal cycles. These measurements demonstrate the high resilience of the material, the transition temperature of which remains invariant (ΔT<1° C.) after more than 10,000 thermal cycles (b) Optical reflectivity (λ=452 nm) measured on a thin film deposited on a glass substrate, showing a relative variation in reflectivity of −5.8% during the transition from the low-spin state to the high-spin state. (c) Variation in the optical index of the thin film (measured at λ=500 nm) as a function of temperature.

Figure 4:
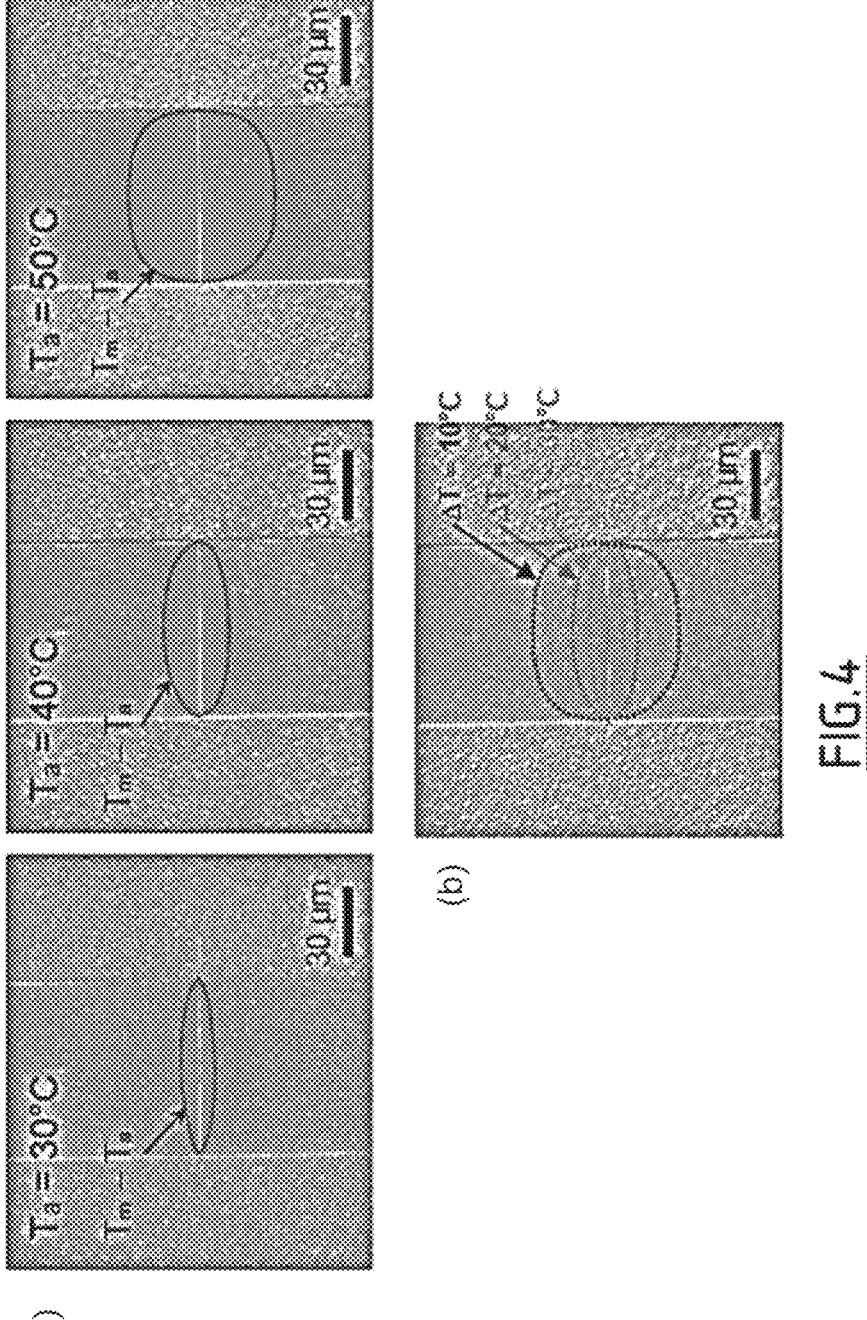

FIG. 4 illustrates the thermometry measurements done on a nanowire of the testing device covered by a layer of [Fe(HB(1,2,4-triazol-1-yl)$_3$)$_2$] 200 nm thick: (a) Reflectivity images (λ=452 nm) obtained by optical microscopy of the nanowire during operation on a glass substrate (traveled by an electric current of 4 mA) at different base temperatures (T$_a$=30° C., 40° C. and 50° C.) and drawing of isothermal lines. (b) Map of temperatures obtained during the operation of the gold nanowire heated by Joule effect.

Figure 5:
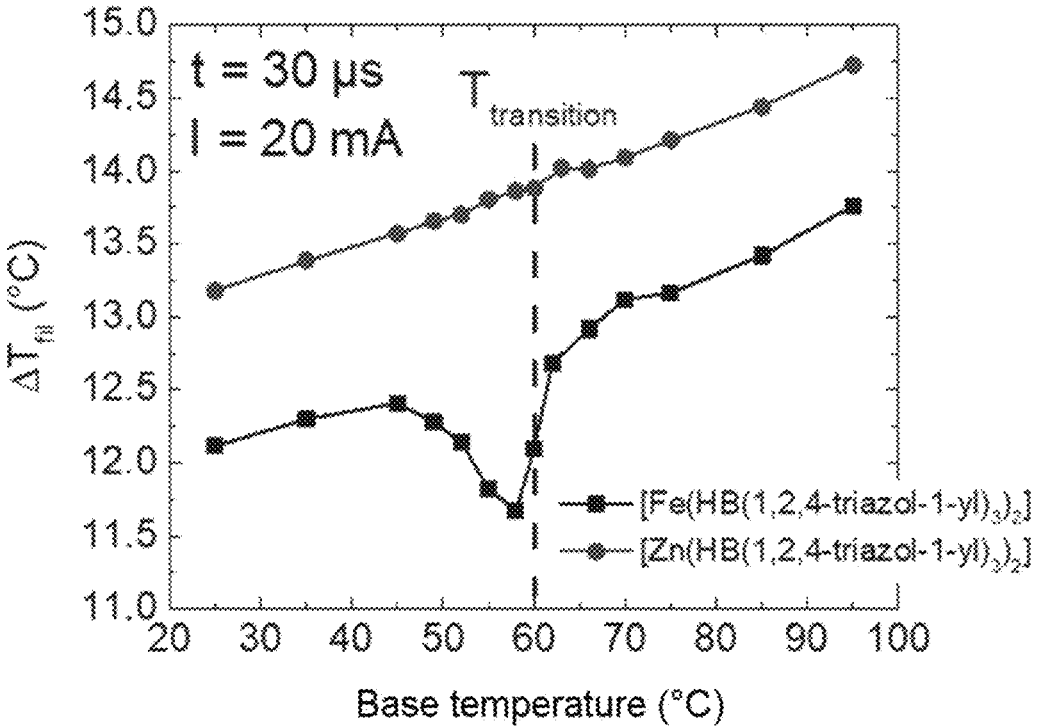

FIG. 5 illustrates the temperature limitation measurements of a gold nanowire of the testing device (glass substrate) covered by a layer of [Fe(HB(1,2,4-triazol-1-yl)$_3$)$_2$] 900 nm thick: Evolution of ΔT$_{wire}$, measured 30 μs after injection of the 20 mA electric current, as a function of the base temperature for the active compound (complex of Fe, [Fe(HB(1,2,4-triazol-1-yl)$_3$)$_2$]) as well as for a similar, but inactive compound (complex of Zn, [Zn(HB(1,2,4-triazol-1-yl)$_3$)$_2$]).

Figure 6:
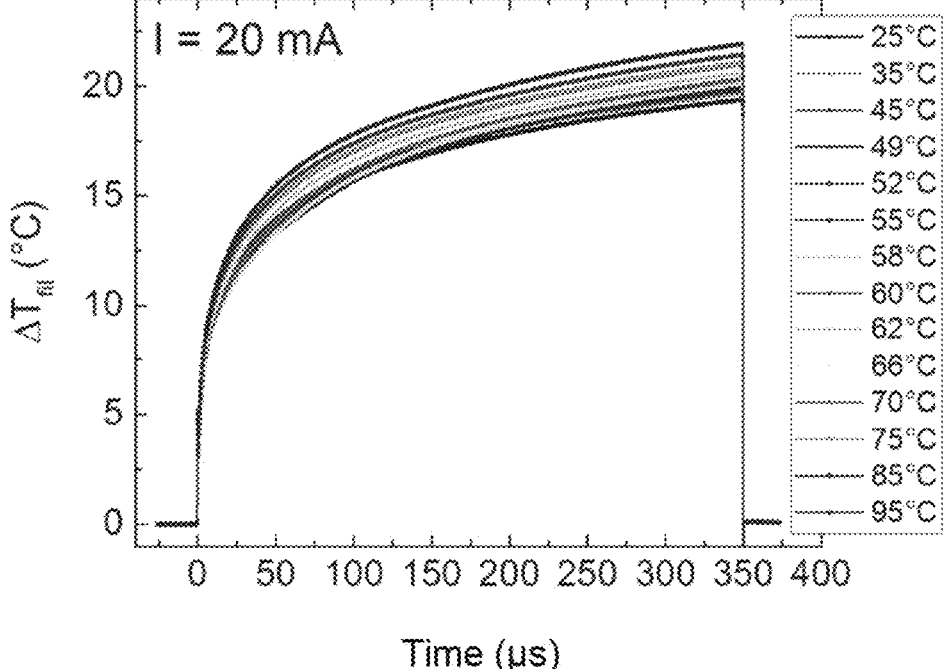

FIG. 6 shows the temperature increase (ΔT$_{wire}$) experienced by a gold nanowire (on a glass substrate) during the time following the sudden injection of a 20 mA electric current for 350 μs, for different base temperatures of the device.

The following examples non-limitingly illustrate the present invention.

EXAMPLES

1. Preparation of the Material

Said material is synthesized according to the protocol described in the article Chem. Ber., 1994, 127, 1379.

2. Deposition on a Component

The deposition of the thin film of [Fe(HB(1,2,4-triazol-1-yl)$_3$)$_2$] on the testing device was done by thermal evaporation in a PREVAC vacuum deposition chamber pressure of about 2×10$^{-7}$ mbar. The powder of the compound was first purified by sublimation, then evaporated at 250° C. at a speed of 0.03 Å/s. The evaporation speed and the thickness of the film were monitored in situ by a quartz microbalance. The obtained films were next subject to a steam treatment, which allowed stable and uniform nanocrystalline films to be obtained [J. Mater. Chem. C, 2017, 5, 4419].

3. Revelation of Thermometric Properties

Figure 1:
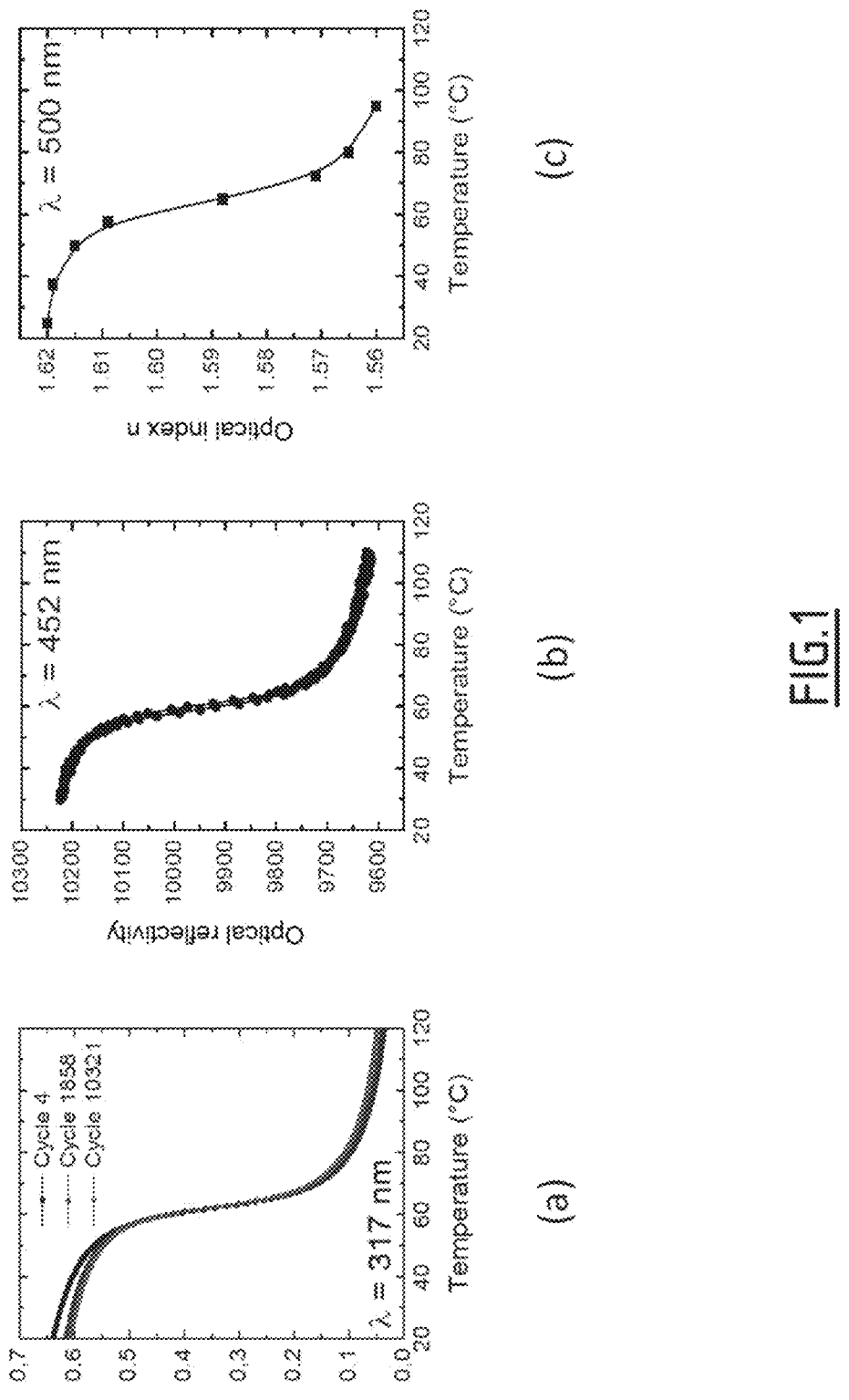

As illustrated in FIG. 1, the transition of the material is accompanied by a significant change in the optical properties of the thin film, in particular of the optical absorbency (FIG. 1a), the optical reflectivity (FIG. 1b) or the optical index (FIG. 1c). This allows the use of different optical techniques to detect the spin transition.

This transition is also accompanied by a state change enthalpy (latent heat) of about 33 kJ/kg (endothermic transition during the passage from the low-spin state to the high-spin state (heating) and exothermic otherwise (cooling)). This latter property may therefore be used to significantly limit a temporary temperature increase.

As shown in FIG. 1a, the temperature and the transition properties of the thin films of said material are not significantly affected, even after more than 10,000 thermal cycles in ambient air.

A thermal map of an electronic circuit was done with a spatial resolution of the order of a micrometer through a series of optical reflectivity measurements. The experimental protocol consists in recording the image of the device covered with said material under optical microscopy (in reflectivity mode) before and after powering on the microcircuit.

Figure 2:
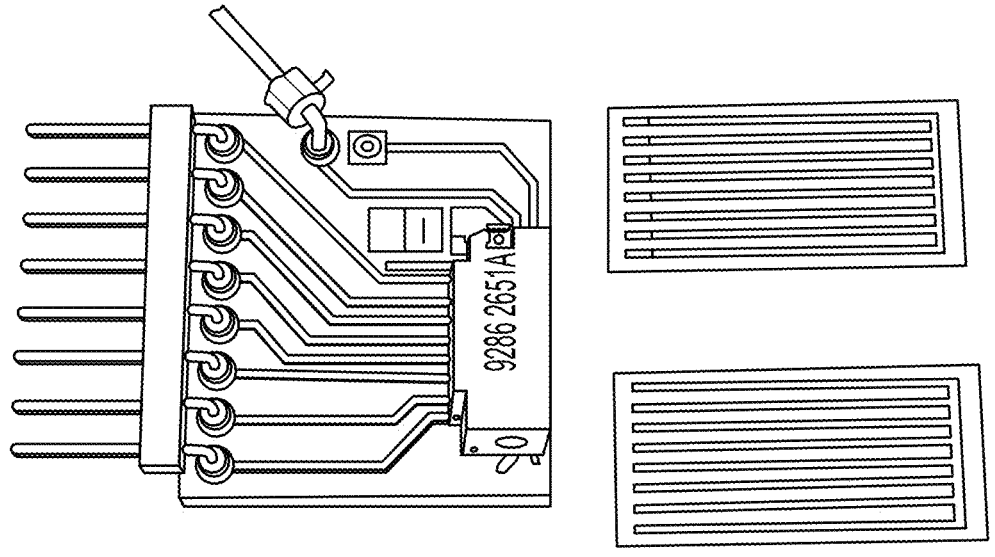
FIG. 2 shows a photograph of the electrical connector (on the left) and of the testing device used in example 1, consisting of a substrate (20×10 mm) made from silicon (in the upper right) or glass (in the lower right) on which 7 gold nanowires are developed.
Figure 3:
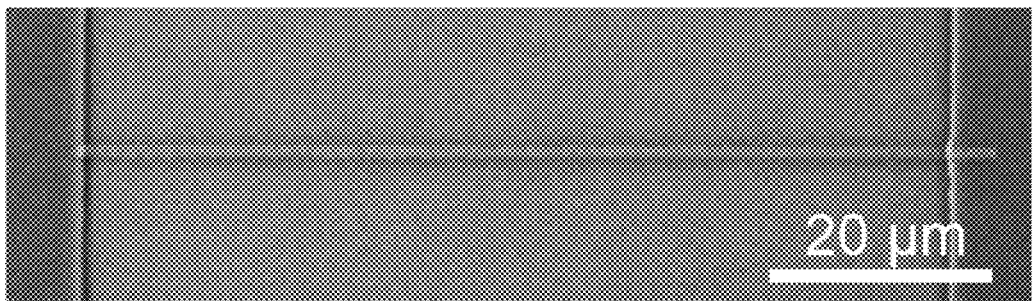
FIG. 3 shows a scanning electron microscopy image of a gold nanowire (width: 1 μm, length: 80 μm, thickness: 50 nm).

As shown by FIG. 2, this experimental protocol was validated on a test device that consists of gold nanowires (width: 1 μm, length: 80 μm, thickness: 50 nm) developed by electronic lithography and photolithography on silicon or glass substrates. This entire device was covered with a thin film of said material 200 nm thick, deposited by thermal evaporation under vacuum. The injection of the 4 mA DC electric current, using a SourceMeter (Keithley 2611A) and a suitable connector, causes heating of the nanowire by Joule effect. Images of the device are recorded by reflectivity (λ=452 nm), before and after its operation, owing to an optical microscope (Olympus BX51) equipped with a ×50 objective (numerical aperture NA=0.5) and a CCD camera (Andor Technology Clara, 1392×1040 pixels with size 6.45 μm). In the optical reflectivity image of the nanowire during operation, two zones are then discernible (FIG. 3): a zone, close to the wire, whose reflectivity has changed during the injection of the current and whose temperature is therefore beyond the transition temperature; and a zone whose optical reflectivity remains unchanged. These two zones are separated by an isothermal line for which the temperature increase corresponds exactly to the difference between the transition temperature of said material (Tien) and the ambient temperature (T$_a$). One of the advantages of this method is that the determination of the temperature increase on this isothermal line may be done without any prior calibration of the reflectivity. Subsequently, heating or cooling of the microcircuit assembly—the latter being placed on a heating/cooling system (Linkam Scientific LTS 120)—to different 'base temperatures' T$_a$ allows as many isothermal lines as desired to be recorded. All of these isothermal lines may next be grouped together on a temperature map (FIG. 4).

4. Revelation of Thermal Inertia Properties

This 'temperature limitation' property has been demonstrated on the same test device consisting of a gold nanowire on a glass substrate, covered by a thin film of said material, and heated by Joule effect following the sudden injection of a 20 mA electric current (FIGS. 5 and 6). During this experiment, the temperature increase of the wire was able to be determined precisely over time (with a temporal resolution of the order of a μs) by measuring the temporal variation of the electric resistance of the wire (which varies linearly with its temperature) using a custom-manufactured differential resistance measuring device [Microelectronics Journal 46 (2015) 1167-1174]. As shown in FIG. 6, the temperature increase of the wire ΔT$_{wire}$ was able to be measured over time for different base temperatures of the device, monitored by a heating/cooling system (Linkam Scientific LTS120). As shown in FIG. 5, the heating of the wire, measured 30 μs after the injection of the current, shows a minimum when the base temperature of the wire is close to the transition temperature. This reduction in the heating of the wire occurs because part of the heat given off by the wire has been absorbed by the spin transition material. The same experiment done when the nanowire is covered by a similar, but inactive compound (complex of Zn, [Zn(HB(1,2,4-triazol-1-yl)$_3$)$_2$]), shows a linear behavior in the heating of the wire as a function of the base temperature (FIG. 5).

The invention claimed is:

1. A method for limiting a temperature in an electronic or photonic component and/or circuit comprising an electronic or photonic component below a temperature Tmax; said electronic or photonic component and/or circuit comprising a film deposited over all or part of said electronic or photonic component, said film comprising a spin transition material, wherein the spin transition material has the following properties:

i. said spin transition material has a spin transition at a temperature of between 4° and 100° C. with a hysteresis width less than 1° C., ii. the stability of said spin transition temperature on cycling is greater than 10,000 thermal cycles with a reproducibility less than or equal to 1° C.; and iii. said spin transition material is sublimable;

wherein Tmax is equal to the spin transition temperature of said spin transition material, wherein the spin transition material is deposited in the form of a continuous and uniform thin layer with a thickness of between 10 nm and 10 μm, and said method comprising:

a. a temperature increase of said electronic or photonic component and/or circuit during its operation, b. when said temperature reaches the value Tmax, said spin transition material undergoes an endothermic spin transition toward the high-spin phase absorbing all or part of the overheating energy and thus limiting the temperature increase until the complete transformation of said material toward the high-spin phase.

2. A method for measuring a temperature increase beyond a temperature Tmax within an electronic or photonic component and/or a circuit comprising an electronic or photonic component, said electronic or photonic component and/or circuit comprising a film deposited over all or part of said electronic or photonic component, said film comprising a spin transition material, wherein the spin transition material has the following properties:

said spin transition material has a spin transition at a temperature of between 40 and 100° C. with a hysteresis width less than 1° C.,

the stability of said spin transition temperature on cycling is greater than 10,000 thermal cycles with a reproducibility less than or equal to 1° C.;

said spin transition material is sublimable;

and such that the spin transition temperature of said spin transition material is equal to Tmax;

wherein the spin transition material is deposited in the form of a continuous and uniform thin layer with a thickness of between 10 nm and 10 μm, said method comprising:

a. measuring at least one optical property of said spin transition material chosen from among the optical index, the optical reflectivity and the optical absorbency, when said electronic or photonic component and/or circuit is off, b. measuring said at least one optical property of said spin transition material when said electronic or photonic component and/or circuit is on, c. identifying zones for which said at least one optical property varies following the spin transition of said spin transition material.

3. The method according to claim 2, wherein the steps b) and c) are repeated at different base temperatures below the temperature Tmax, by increasing and/or decreasing the temperature of said electronic or photonic component and/or circuit comprising an electronic or photonic component, and a map of the temperature of said electronic or photonic component and/or the circuit is established.

4. The method according to claim 1, wherein said spin transition material is [Fe(HB(1,2,4-triazol-1-yl)$_3$)$_2$].

5. The method according to claim 1, wherein said spin transition material is [Fe(HB(1,2,4-triazol-1-yl)$_3$)$_2$].

\* \* \* \* \*